(No Model.)
L. JOHNSTON.
FILTER.
No. 605,046. Patented May 31, 1898.
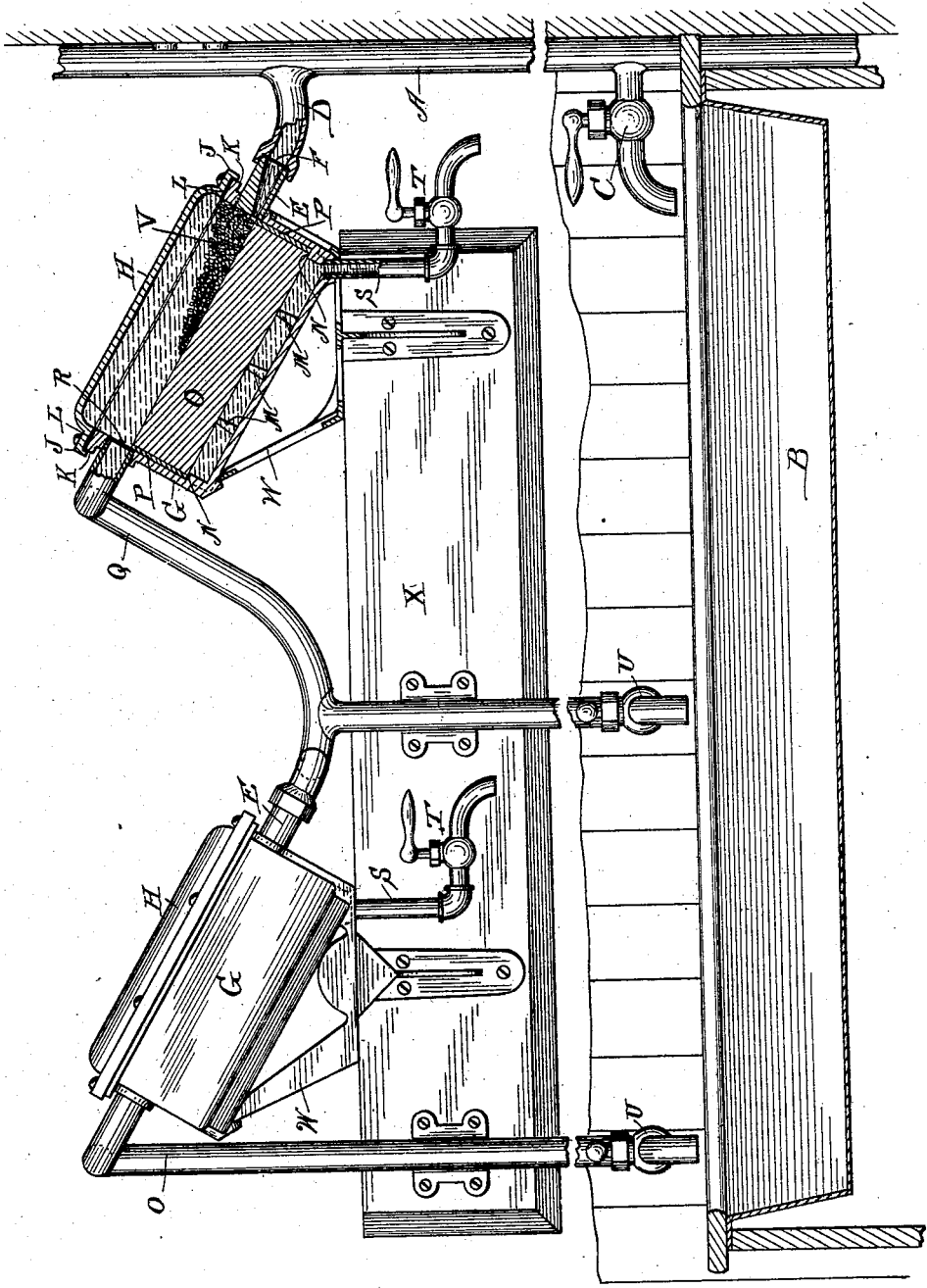
Witnesses:
W. J. Jaeker.
F. E. Brown.
Inventor:
Lysander Johnston
By John Howard McElroy,
Atty.

UNITED STATES PATENT OFFICE.

LYSANDER JOHNSTON, OF CHICAGO, ILLINOIS, ASSIGNOR OF ONE-HALF TO GUSTINE I. LADD AND HENRY A. BUELL, OF SAME PLACE.

FILTER.

SPECIFICATION forming part of Letters Patent No. 605,046, dated May 31, 1898.

Application filed November 1, 1897. Serial No. 657,029. (No model.)

*To all whom it may concern:*

Be it known that I, LYSANDER JOHNSTON, a citizen of the United States, residing at Chicago, in the county of Cook and State of Illinois, have invented certain new and useful Improvements in Filters, of which the following is a specification.

My invention relates to filters of that class designed mainly to purify water for drinking and other purposes, and is designed to produce a filter which shall be simple in its construction, thorough in its operation, and capable of being cheaply constructed.

My invention further relates to a filter which is introduced into the plumbing and is so constructed in connection with its location in the plumbing that it is automatically cleaned when any water is used for culinary or bath-room purposes.

My invention further relates to a plurality of filters connected together in a system capable of furnishing whatever quantity of filtered water may be required and so constructed and located as to be automatically cleaned whenever any unfiltered water is used.

My invention also relates to a filtering system in which all of the water can be withdrawn when desired, so as to prevent any possibility of its freezing.

In order that a clear and complete understanding may be had of my invention, reference is made to the accompanying sheet of drawings, in which my improved apparatus is represented, one of the filters being in central longitudinal section and the sink also being represented in section.

In my improved system, A represents the supply-pipe leading from the city mains or other source of supply, and B may represent the kitchen-sink, in case the filter is located in connection therewith, as will ordinarily be the case. C represents a cock for drawing water from this supply-pipe A before it has reached the filters.

D is a connecting-pipe leading from the supply-pipe to the first filter and terminates in a nozzle E, which is screwed into the end of the filter-casing. A small screen F is placed in the joint between the pipe B and the nozzle E for a purpose to be subsequently described.

The filter-casing may consist of a substantially rectangular trough portion G, upon which is placed the cap H, which has the flange J resting upon the flange K, forming the rim of the main portion G. A gasket L is interposed between these two flanges, which are then securely bolted together, so as to form a water-tight junction. The lower portion of the filter-casing may be porcelain-lined and has a series of lugs M, which project up to the height of the shoulder N, formed in the interior surface of the casing. A plate O, of any suitable filtering material, such as tile, soapstone, or brick, rests upon these lugs M and the shoulder N and is securely fastened in place by the layer of cement P, which surrounds it. The nozzle E opens just above the upper surface of this plate O, and the exhaust-pipe Q from the filter is oppositely disposed and preferably at the same height in relation to the upper surface of the plate O. The opening to the exhaust-pipe Q is also protected by a screen R, for the purpose to be presently described. Beneath the filtering-plate O a discharge-pipe S opens into the filter and is furnished with a cock T for drawing off the filtered water. The exhaust-pipe Q is provided with a cock U, suitably located in connection with the sink.

From the structure thus far described it will be seen that the water from the supply-pipe A may pass into the filter above the plate O and will pass therethrough, so that the filtered water may be drawn off by the cock T.

In order to provide for the automatic cleansing of the filter, I place above the plate O some coarse gravel V, which is directly in the path of the stream of water coming from the nozzle E, and to increase the force of the water from this nozzle I preferably contract it at one end, as seen, so that the discharge end of the nozzle will only be a very small fraction of the receiving end, say one-fourth thereof. Whenever the cock U is opened, the water rushing from the nozzle E will force the gravel V over the surface of the plate O, thus scouring off the accumulated deposit and washing it out through the discharge-pipe. I preferably have the upper side of the filtering-plate O arranged at an angle, so that the gravel which has been forced upward by the force of the water will roll back when the water is turned off, thus causing a reciprocation of the gravel over the surface of the filtering-plate which is to be cleansed. I may obtain the inclined upper surface of this plate by various means; but I preferably incline the entire filter-box by means of mounting it in a bracket, such as W, which is so arranged as to hold one end lower than the other. This bracket W may be fastened to a wooden panel X, which is in turn fastened to the wall and furnishes a convenient means of attaching all the various pipes used in connection with the system. When the filter is thus inclined, I have the filter discharge-pipe S open into the filter at the lowest portion thereof, so that, if desired, the contents may be completely drained off. As stated above, the opening of the cock U will serve to cause the reciprocation of the gravel V to cleanse the filter; but I may obtain this movement of the gravel even more effectually by opening the cock C, as while this cock is opened the pressure above it is lowered, so that when the cock C is closed, the pressure above it being increased suddenly, the water is forced through the nozzle E with considerable violence, so that the gravel V will be thoroughly agitated. It will be seen that by this construction I am enabled to cleanse the filter automatically whenever any water is withdrawn for household purposes, and as the amount of water employed for such purposes is ordinarily very much greater than the amount of filtered water that is employed the sediment from the filter will be so small as to have very little effect in diminishing the purity of the water used for household purposes.

The parts so far described constitute a complete filter; but in case I desire to obtain a larger quantity of water I may duplicate the filters or employ any number that may be desired, making the connections as shown. It will be observed that all the cocks are at the lowest points of the various pipes and receptacles, so that by shutting off the water below the cock C all the water in the filters and system may be completely drained off, as will be desirable when there is any danger of freezing. It will also be observed that the conical nozzle E is directed upon the surface of the filtering-plate O, so that the action of the water, unaided, tends to cleanse it; but the addition of the gravel or other abrading material aids this action. The screens F and R are employed simply to confine the gravel within the filter and to prevent it getting into the pipes.

My invention is capable of several modifications, and I do not desire to be limited to the exact form shown and described, but only as may be necessitated by the state of the art and the following claims.

I claim—

1. A filter comprising the filter-plate having the inclined upper surface, the layer of abrading material thereon, the supply-pipe having the nozzle directed upward upon the upper surface of the filter-plate and into said layer of abrading material, one or more exhaust-pipes opening into the filter above said filter-plate, and the filter discharge-pipe opening into the filter at the under side of said filter-plate, substantially as shown and described.

2. A filter comprising the filter-plate having an inclined upper surface, a layer of coarse abrading material thereon, the supply-pipe opening into the filter just above the lowest portion of the surface of the plate and having the contracted nozzle directed thereon, the exhaust-pipe opening into the filter just above the highest portion of the plate, and the filter discharge-pipe opening into the filter at the under side of said plate, substantially as shown and described.

3. A filter comprising the filter-plate having an inclined upper surface, a layer of coarse abrading material thereon, the supply-pipe opening into the filter just above the lowest portion of the surface of the plate and having the contracted nozzle directed thereon, the exhaust-pipe opening into the filter just above the highest portion of the plate, screens to prevent the escape of the abrading material from the filter, and the filter discharge-pipe opening into the filter at the under side of said plate, substantially as shown and described.

4. A filter comprising the body portion set in an inclined position, the filter-plate thereon having the inclined upper surface, a layer of coarse abrading material thereon, the supply-pipe having the nozzle directed upon the upper surface of the filter-plate and into the abrading material, the exhaust-pipe opening into the filter just above the filter-plate, and the filter discharge-pipe opening into the lowest angle of the filter at the under side of said plate, substantially as shown and described.

5. A filter comprising a layer of solid filtering material, with the layer of abrading material thereover, the supply-pipe having a contracted nozzle directed upon the surface of said filtering material and into the abrading material for reciprocating the abrading material over the surface of said plate, the discharge-pipe, and the cock, C, for drawing off the water located between the head of water and the filter, substantially as described.

6. A filtering system comprising the cock, C, located in the supply-pipe, the contracted nozzle, E connected to said supply-pipe and opening into the filter, the inclined filter-plate, O, having the abrading material, V, thereon, the discharge-pipe, Q, opening into the filter just above the upper surface of the filter-plate, O, the discharge-cock, U, and the outlet, S, for the filtered water opening into the filter beneath the plate, O, all coöperating substantially as and for the purpose described.

LYSANDER JOHNSTON.

Witnesses:
G. I. LADD,
H. A. BUELL.